United States Patent [19]

Pietrafesa

[11] Patent Number: 4,664,396
[45] Date of Patent: May 12, 1987

[54] MULTI-FUNCTION BABY DOLL ACCESSORY

[75] Inventor: Michael Pietrafesa, Brooklyn, N.Y.

[73] Assignee: Eugene Doll & Novelty Co., Inc., Brooklyn, N.Y.

[21] Appl. No.: 760,462

[22] Filed: Jul. 30, 1985

[51] Int. Cl.⁴ .............................................. B62B 1/04
[52] U.S. Cl. ................................ 280/30; 280/47.38; 297/130; 297/134
[58] Field of Search ............... 446/482, 268, 269, 279, 446/451, 93, 95; 297/130, 134, 377, 250, 174, 183, 363; 280/47.38, 31, 30, 47.41

[56] References Cited

U.S. PATENT DOCUMENTS

| | | | |
|---|---|---|---|
| 1,213,017 | 1/1917 | Reinert | 280/47.38 |
| 2,489,084 | 11/1949 | Ducey | 297/174 |
| 2,968,338 | 1/1961 | Reese | 297/134 |
| 3,138,400 | 6/1964 | Reid | 297/363 X |
| 3,243,229 | 3/1966 | Barnhill | 297/134 |
| 3,335,434 | 8/1967 | Gamon | 297/250 |
| 3,550,998 | 12/1970 | Boudreau et al. | 280/31 |
| 4,371,206 | 2/1983 | Johnson, Jr. | 297/377 X |

Primary Examiner—Mickey Yu
Attorney, Agent, or Firm—Michael Ebert

[57] ABSTRACT

An accessory for a baby doll constituted by a seater module that is combinable with a carriage module. The seater module includes a strap-in rockable cradle for the doll and a bail-type handle therefor which can be set at any desired angle relative to the cradle or disconnected therefrom. The seat module is selectively operable in the following modes: a hand carrier mode in which the handle is upright, making it possible for a child to carry the cradled doll; a car seater mode in which the handle is at an easel angle relative to the cradle so that the module may be rested on a car seat; a table seater mode in which the handle rests on a table surface and the cradled doll is seated adjacent thereto; and a rocker mode in which the handle is removed. When the seater module is combined with the carriage module, the accessory is then capable of functioning in a baby carriage mode or in a stroller mode.

8 Claims, 14 Drawing Figures

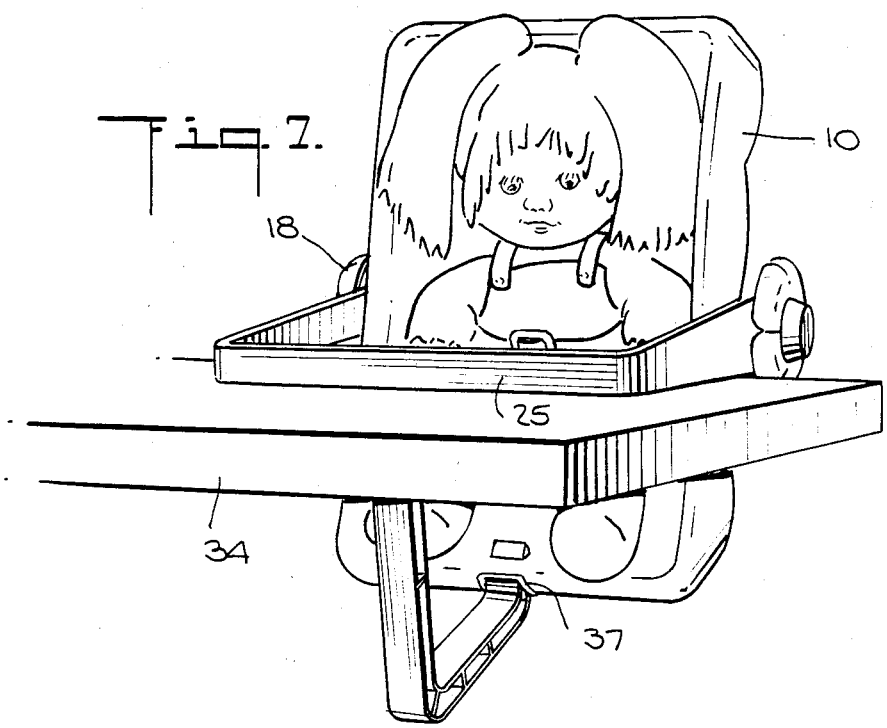
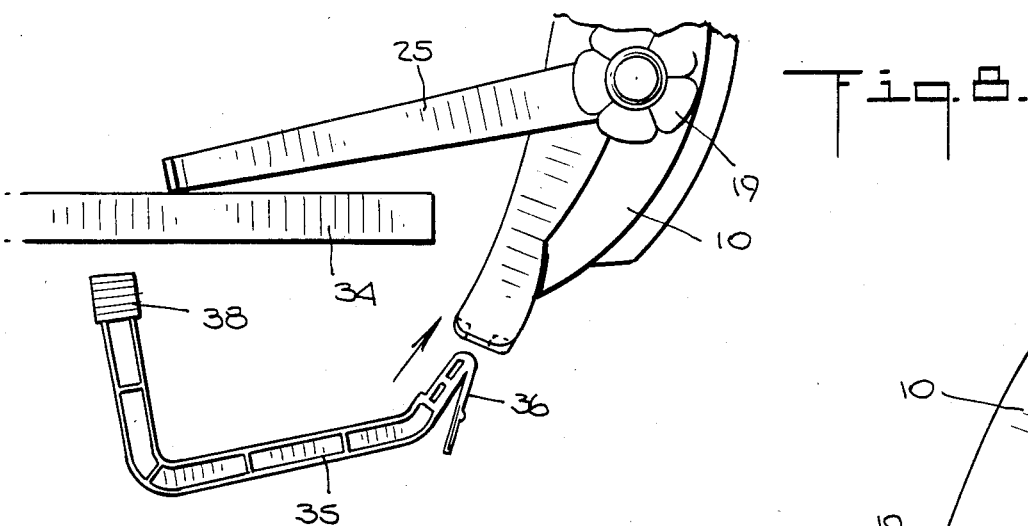
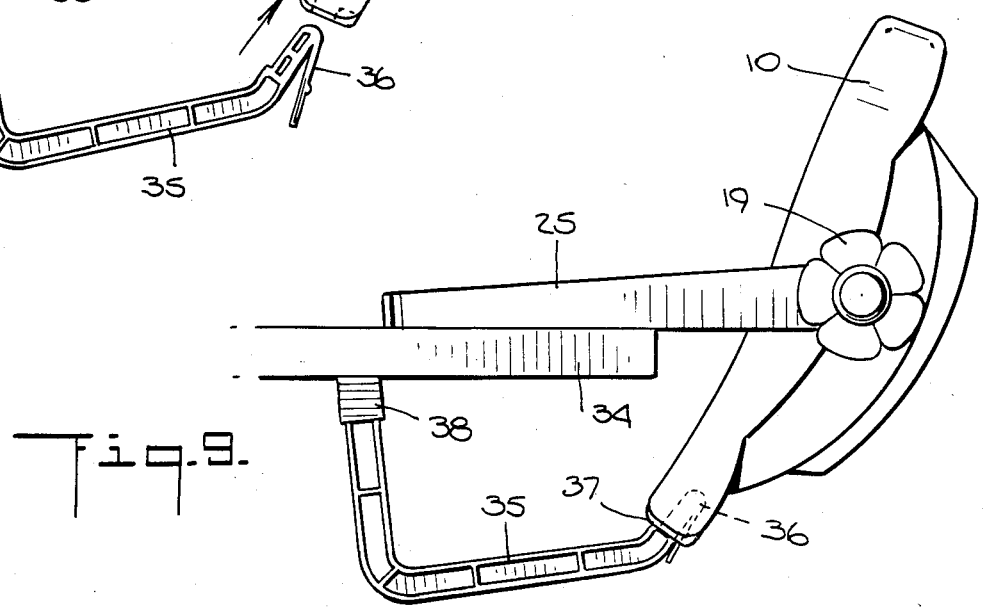

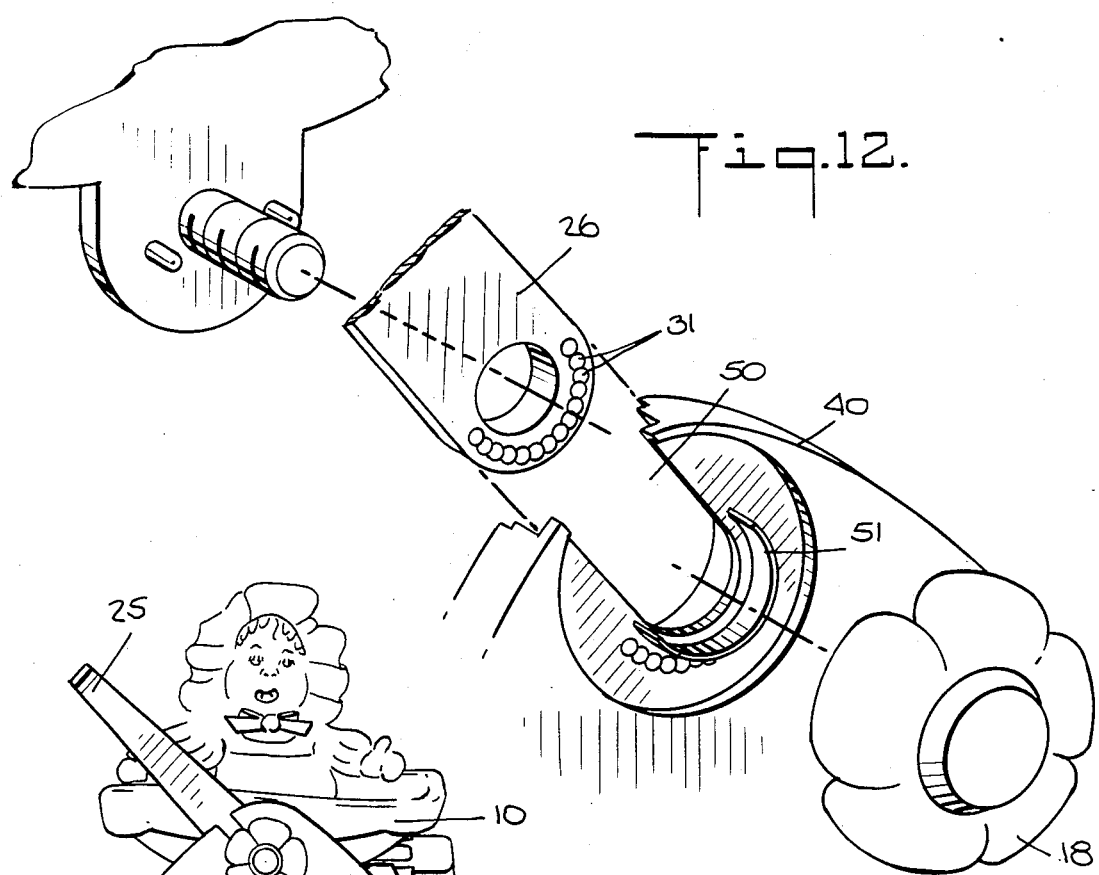
Fig. 12.
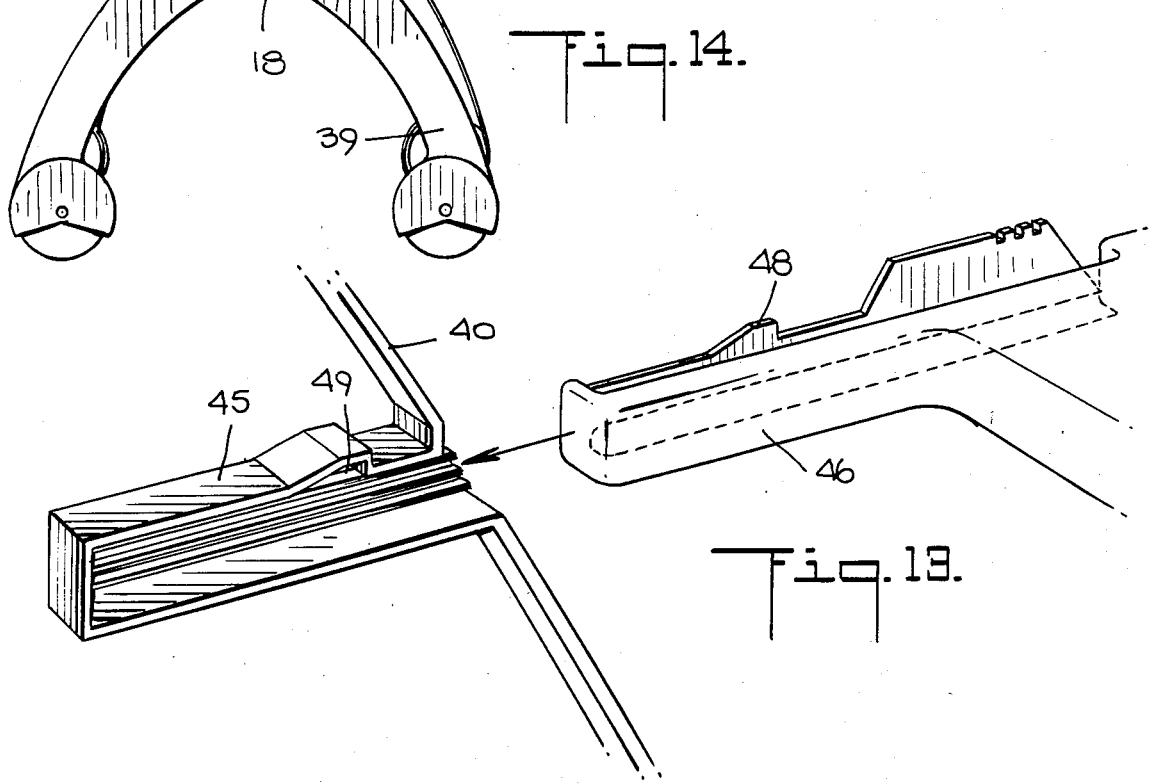
Fig. 14.
Fig. 13.

MULTI-FUNCTION BABY DOLL ACCESSORY

BACKGROUND OF INVENTION

1. Field of Invention

This invention relates generally to play accessories for baby dolls, and in particular to a multi-function accessory constituted by a seater module which is selectively operable in any one of four distinct modes and which when combined with a carriage module is also operable in two additional modes.

2. Status of Art

Play dolls have existed throughout the ages, as evidenced by the primitive dolls of wood, clay, bone and ivory uncovered in the ruins of ancient civilizations such as Egypt and Greece. A baby doll exerts a strong appeal, for it enables a child to play act the role of a parent, and in the course of doing so to simulate a broad range of adult activities.

The process of childhood development involves imitative behavior in which the playing child carries out an action which he has observed in the adult world. Thus a child who assembles building blocks to create a structure seeks to emulate adult activity he has seen at a building site, and he thereby gains at least a naive understanding regarding the nature of construction. And in playing with a baby doll, a girl usually imitates the parental activity she has observed and thereby learns the fundamentals of rearing children. Thus childhood play is not aimless, but represents the earliest form of apprenticeship.

The play value of a toy or doll often depends on the extent to which it puts the children in a position to simulate an adult activity. Thus a toy automobile which actually runs and can be steered is of greater sustaining interest to a player than a toy car having wheels that do not turn. By the same token, a doll which has some of the characteristics of a live baby has far greater appeal to a child than a doll lacking such characteristics.

Children are aware of the relationship of a baby to its parents, and know that no two babies are quite alike or have the same name. To commercially exploit this awareness, computer-generated baby dolls have in recent years been introduced into the doll market and though these dolls are mass-produced, no two look exactly alike. And to further blur the line of demarcation between play and reality, these individualized dolls are packaged with a blank birth certificate and adoption papers. Thus the fortunate child who comes into possession of a doll of this type is in a position to formally adopt the doll and to give the doll a name.

Because the adopted doll is now the child's own baby, in assuming the role of a responsible mother concerned with the wellbeing of her baby, the child is guided by her own experiences in this regard. For example, the child knows that the baby must be fed, it must be rocked to sleep, and on occasion it must be taken to the park in a baby carriage, while at other times, it must be seated at a table or placed securely on the seat of an automobile.

In order to satisfy these requirements, accessories are now commercially available for baby dolls, such as hand carriers, miniature high chairs, rockers, doll carriages, and various other devices appropriate to the range of activities entailed in rearing a baby doll.

These accessories, taken collectively, are quite expensive and in many cases beyond the means of the typical middle-class parent. Moreover, the accessories require a substantial amount of storage space, and this space may not be available in an already-crowded play room or other facility.

SUMMARY OF INVENTION

In view of the foregoing, the main object of this invention is to provide a multi-function play accessory for a baby doll which is selectively operable in any one of several modes whereby the same accessory may be used by the player to hand carry the doll, to seat the doll in an automobile, to rock the doll to sleep, to take a stroll with the doll and to carry out other play activities appropriate to a baby.

More particularly, it is an object of the invention to provide a multi-function accessory which includes a seater module selectively capable of operating in four distinct modes, the seater accessory being combined with a carriage module which makes it possible to operate in two additional modes.

Also an object of this invention is to provide a low-cost accessory of the above type which is easy to operate and which is readily transformable into any desired mode.

Briefly stated, these objects are attained in an accessory for a baby doll constituted by a seater module that is combinable with a carriage module. The seater module includes a strap-in rockable cradle for the doll and a bail-type handle therefor which can be set at any desired angle relative to the cradle or disconnected therefrom. The seat module is selectively operable in the following modes: a hand carrier mode in which the handle is upright, making it possible for a child to carry the cradled doll; a car seater mode in which the handle is at an easel angle relative to the cradle so that the module may be rested on a car seat; a table seater mode in which the handle rests on a table surface and the cradled doll is seated adjacent thereto; and a rocker mode in which the handle is removed. When the seater module is combined with the carriage module, the accessory is then capable of functioning in a baby carriage mode or in a stroller mode.

OUTLINE OF DRAWINGS

For a better understanding of the invention as well as other objects and further features thereof, reference is made to the following detailed description to be read in conjunction with the accompanying drawings, wherein:

FIG. 7 shows the seater module in the table-seater mode;

FIG. 8 illustrates the manner in which the table clamp cooperates with the cradle in the table-seater mode;

FIG. 9 is a side view of the seater module in the table-seater mode;

FIG. 12 illustrates how the two modules are combined;

FIG. 13 shows how a feeding tray is joined to the carriage module; and

FIG. 14 shows the combined modules in the baby carriage mode.

DESCRIPTION OF INVENTION

Figure 1:
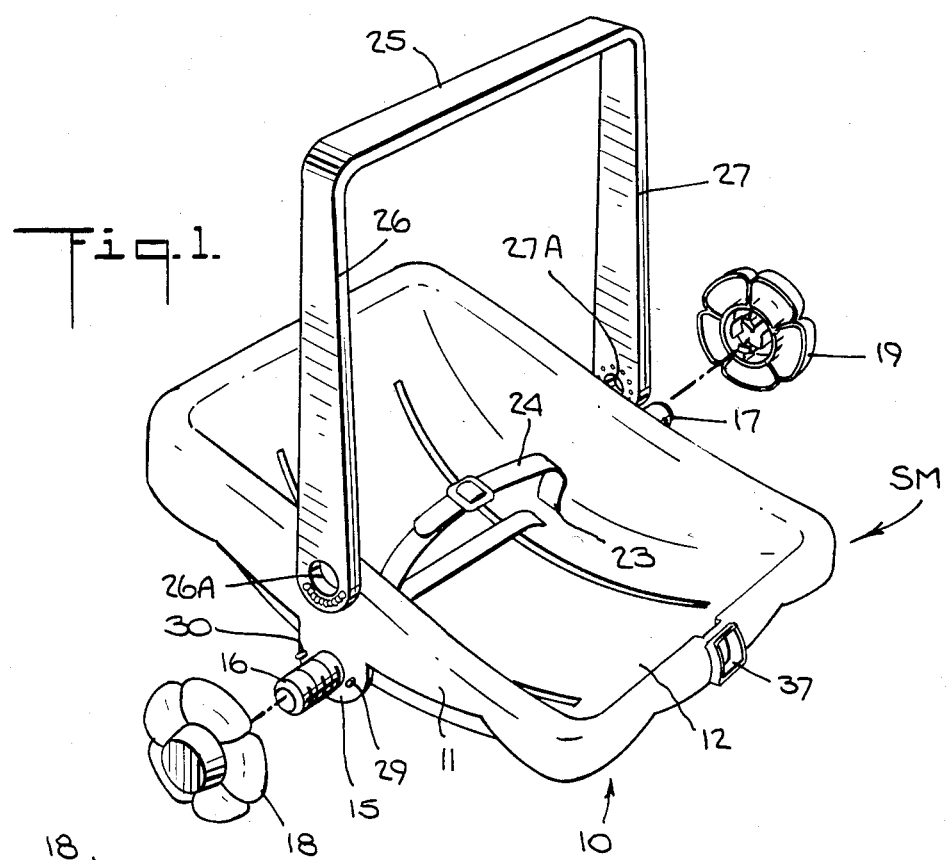
FIG. 1 shows in perspective the basic components of a seater module in accordance with the invention.
Figure 10:
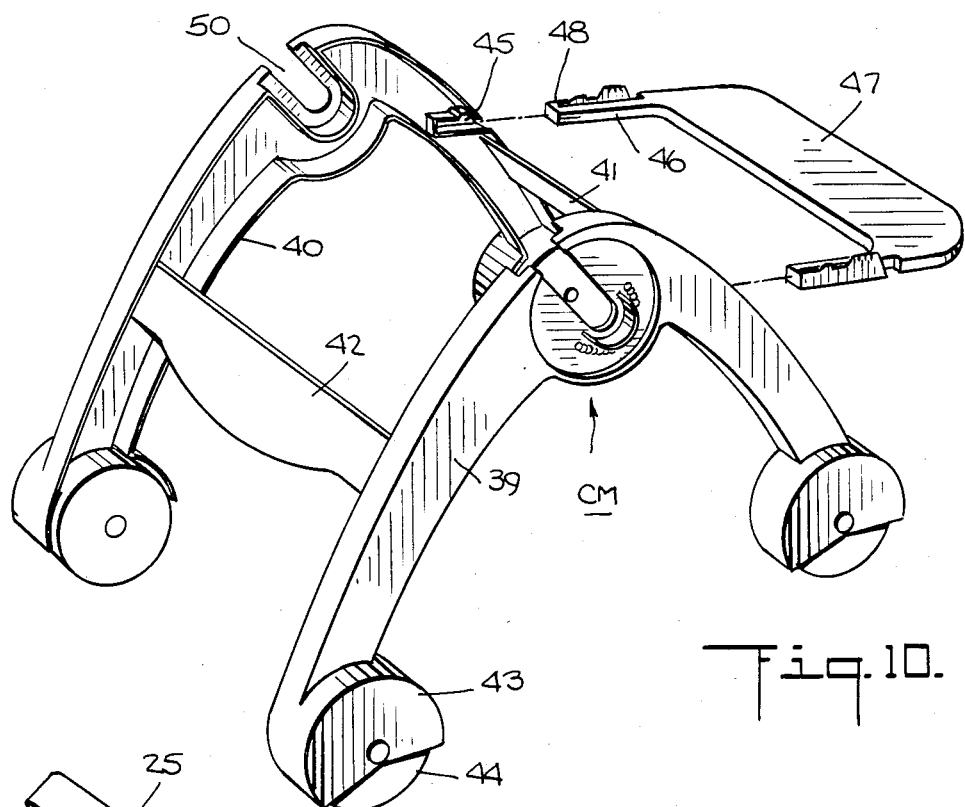
FIG. 10 illustrates in prospective the carriage module of the accessory.

The Two Basic Modules:

A play accessory for a baby doll is composed of two basic modules, namely, a seater module as shown in FIG. 1, generally designated by reference SM, and a carriage module, as shown in FIG. 10, generally designated by reference CM.

The seater module includes a rocker cradle and a bail-type handle therefor which may be set at any desired angle relative to the cradle or disconnected therefrom. The seater module is selectively operative in any of the following four modes:

A. A hand carrier mode in which the handle is upright above the cradle, making it possible for a child to carry a doll strapped in the cradle by the handle;

B. A car-seater mode in which the handle assumes an easel angle behind the cradle, making it possible to rest the module on the seat of an automobile with the doll strapped in the cradle at a raised position;

C. A rocker mode in which the cradle with the handle removed, functions as a rocker, making it possible for the child to rock the baby doll to sleep; and D. A table-seater mode in which the handle rests on the upper surface of a table and the cradle is then angled to seat the doll strapped therein adjacent the edge of the table, this position being maintained by a table clamp associated with the module.

When the seater module is intercoupled with the carriage module, the following two additional functional modes are then realized:

E. In the fifth mode, these combined modules function as a pram or baby carriage in which the doll lies within a horizontally-oriented cradle;

F. And in the sixth mode, the combination of modules functions as a stroller in which the cradle is angled to raise the doll strapped therein to a seated position, a feeding tray then being associated with the stroller.

Thus the two modules provide a compact multi-function play accessory for a baby doll that heretofore required six independent accessories to perform in modes A to F.

Figure 2:
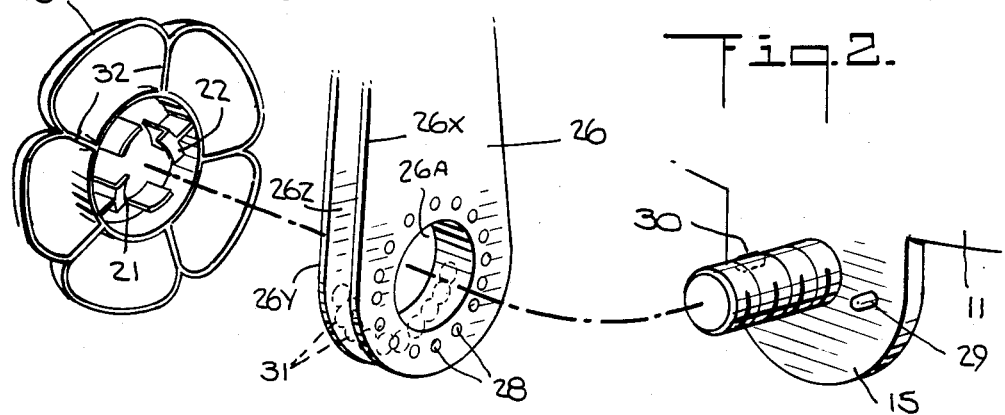
FIG. 2 is an exploded view showing how one arm of the handle included in the seater module is attached to a stud on the cradle.
Figure 3:
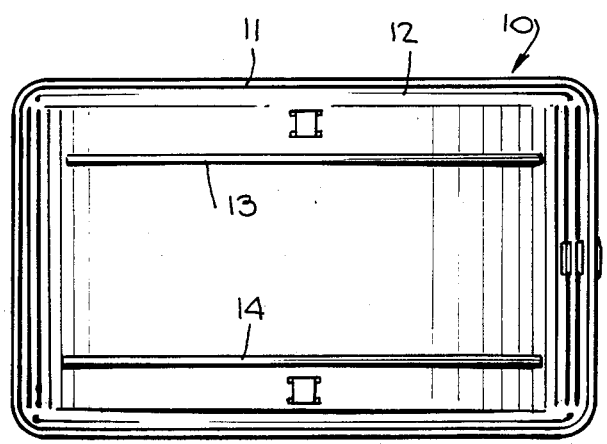
FIG. 3 is a bottom view of the cradle.

The Seater Module:

As shown in FIGS. 1, 2 and 3, the seater module SM includes a generally rectangular rocker cradle 10 molded of synthetic plastic material of good structural strength, such as PVC or polyethylene. Cradle 10 is provided with a belled-out bottom wall 12 on whose contoured outer surface is formed a pair of arcuate rocker rails 13 and 14.

Each side wall 11 of the cradle is provided at its midpoint with a downwardly extending tab; only tab 15 being shown in FIG. 1. Supported on the tabs and projecting therefrom are threaded studs 16 and 17 on which hub nuts 18 and 19 are receivable. These nuts, as shown in FIG. 2, have a flower-like appearance and are provided with diametrically-opposed internal teeth 21 and 22 which engage the helical threading on the studs. The teeth lie within a ring having blade-like ribs 32 which radiate therefrom to define the lobes or petals on the flower.

Threaded through slots 23 in the bottom wall 12 of the cradle is a buckled strap 24. This makes it possible to strap a doll in the cradle so that the doll is held securely therein regardless of the position assumed by the cradle.

Associated with the cradle is a bail-shaped handle 25 which is molded of flexible synthetic plastic material and is provided with a pair of parallel side arms 26 and 27. These are spaced apart by a distance equal to the width of the cradle.

Adjacent the ends of the arms are mounting bores 26A and 27A through which studs 16 and 17 are extendible. Each arm, as shown in connection with arm 26 in FIG. 2, is formed with an inner face 26X whose margin is spaced from the margin of an outer face 26Y by a peripheral groove 26Z. Formed in inner face 26X is an array of pin holes 28 in a circle concentric with bore 26A. These pin holes cooperate with locking pins 29 and 30 projecting from side wall tab 15.

Thus when arm 26 of the handle is flexed to receive stud 16 which acts as a pivot therefor, the handle may be oriented at any desired angle relative to the cradle. And when the arm is then brought against tab 15, the pins 29 and 30 enter those pin holes in registration therewith to lock the handle at the desired angle.

This angled position is securely maintained by tightening nut 18 on stud 16. The outer face 26Y is provided with an arcuate series of detent bosses 31 which engage the radial ribs 32 on the interior of hub nut 18, such that when the nut is tightened, the blade-like ribs lie between adjacent detents and serve to resist loosening of the hub nut.

Figure 4:
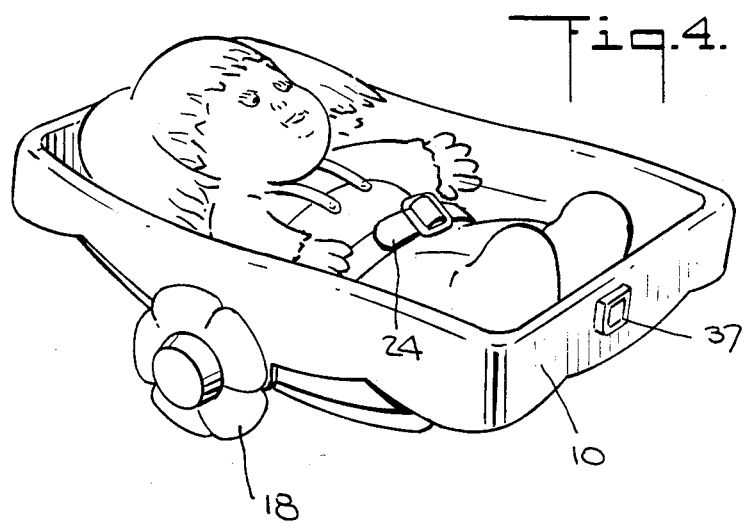
FIG. 4 shows a baby doll strapped in the cradle when the seater module operates in the rocker mode.

The Four Modes:

As shown in FIG. 4, when the cradle 10 of the seater module has its hub nuts 18 and 19 tightened on the projecting studs, with the handle disconnected, then the module in this condition functions as a rocker with respect to a baby doll B strapped in the cradle. In this mode, a child can rock her baby doll to sleep. In this activity, the player before putting the baby doll into the cradle may dress the doll in sleeping pajamas, thereby imitating a real life situation.

Figure 5:
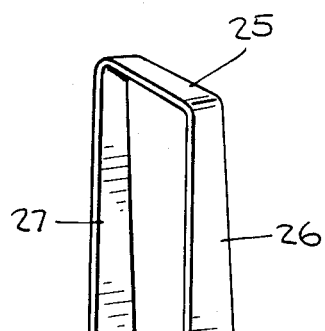
FIG. 5 shows the seater module in the hand-carrier mode.

And when the baby doll wakes up, the child may choose to take the doll to visit a friend, and for this purpose it is necessary to convert the seater module into a hand carrier as shown in FIG. 5. In this operating mode, the handle 25 is attached to cradle 11 at an upright position above the midpoint of the cradle so that the doll strapped in the cradle is held in a balanced state.

Figure 6:
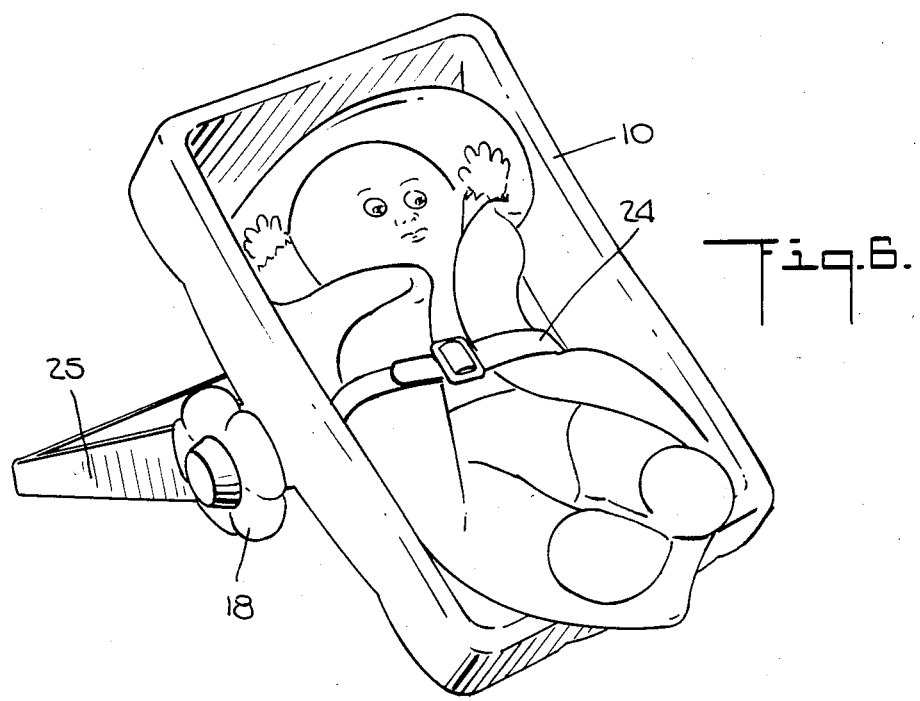
FIG. 6 shows the seater module in the car-seater mode.

If now the child decides to accompany a parent on an automobile ride to go shopping or to some other destination, and the child wishes to bring her baby doll along, the baby doll is then warmly wrapped in a blanket and again strapped into cradle 11. However, in the car seater mode as shown in FIG. 6, the handle 25 is oriented to assume an easel angle behind cradle 10, thereby somewhat elevating the baby doll. In this mode, the seater module may rest on the seat of the automobile next to the child.

When the child wishes to play or eat at a table and to have her baby doll participate in this activity, the seater module is converted into the table-seater mode as shown in FIGS. 7, 8 and 9. In this mode, handle 25 rests on the upper surface of a table 34 and the cradle 10 in which the baby doll is strapped assumes an almost vertical position to raise the doll to a seating position adjacent the table.

To maintain this position, an L-shaped table clamp 35 is provided in the form of a molded beam having at the end of one of its legs a depressible latching element 36. This fits into a socket 37 formed in the front end wall of the cradle as shown in FIG. 8. The other leg of the clamp 35 terminates in a rubber-like tip 38 which engages the undersurface of table 34. Thus when the module is in place as shown in FIG. 9, the load imposed downwardly by the cradle having the doll strapped therein is applied by the table clamp tip 38 upwardly to the underside of the table, thereby maintaining the module in position without the need to couple the module to the table. It is a simple matter to detach the module from the table, for one has simply to lift the cradle to release tip 38 from the underside thereof, and then retract the module from the table.

The Carriage Module:

As shown in FIG. 10, the carriage module CM includes two molded main frame pieces 39 and 40 having an arched formation in parallel relation. These arched pieces are joined together by a front crosspiece 41 and a rear crosspiece 42. The four legs of the main pieces terminate in roller housings 43, each having a roller 44 mounted on an axle.

Formed at corresponding positions in the front legs of the carriage module are sockets 45 adapted to receive the parallel cantilevered arms 46 of a feeding tray 47. Each arm is provided with a detent 48 which snaps into a cavity 49 in the socket as shown in FIG. 13, so that the tray may be installed or removed as desired.

Formed adjacent the peak of each main piece 39 and 40 is an inclined slot 50 which terminates in an arcuate stop 51, the slot being dimensioned to receive an arm of handle 25, such as arm 26 as shown in FIG. 12. Thus handle 25, when its arms are inserted in the slots 50 of the carriage module, then bridges the main pieces of the module to provide a rearwardly inclined handle for the carriage to facilitate pushing of the carriage.

When the handle arms are in slots 50 and the studs, such as stud 16 of the cradle, extend through the bore 26A of the handle arm end as shown in FIG. 12, the arms are locked to the carriage by the hub nuts such as nut 18, for the arcuate stop 51 below the slot 50 fits into the annular region (see FIG. 2) between the interior teeth in the nut and the ring surrounding the teeth to prevent withdrawal of the handle.

Figure 11:
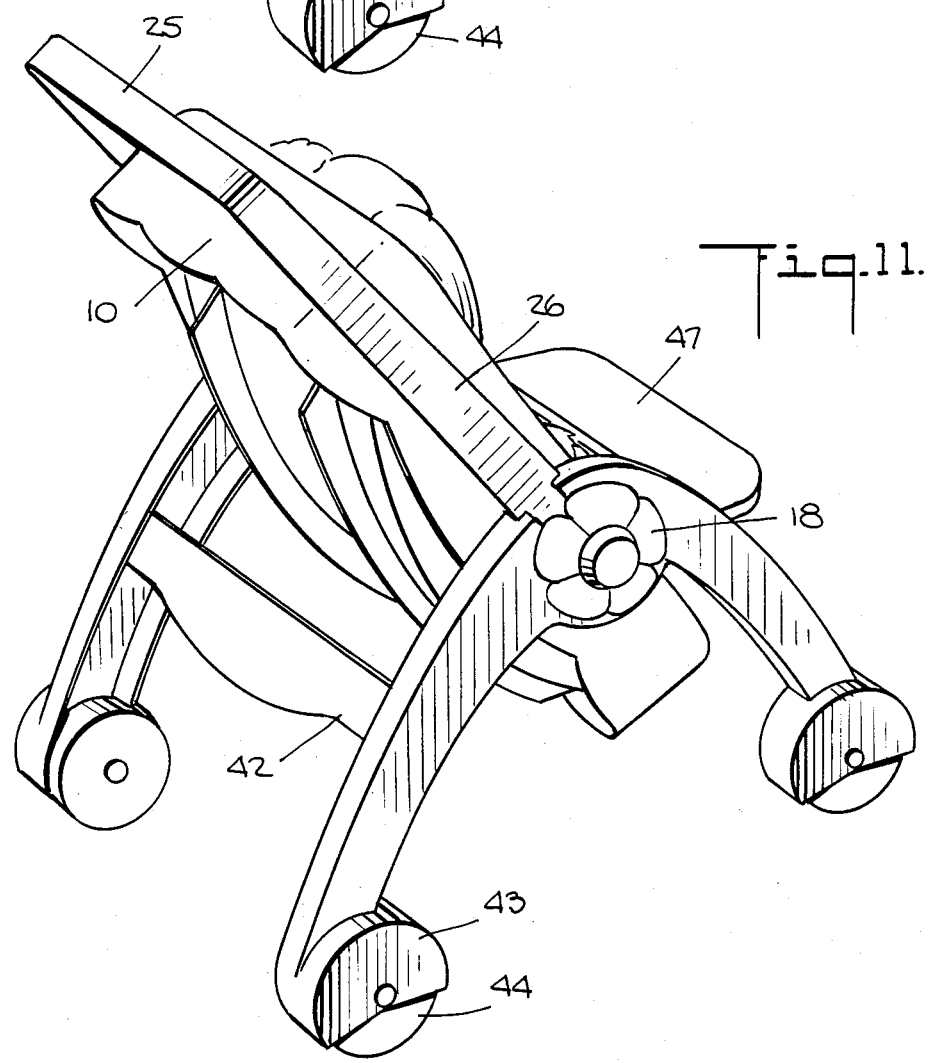
FIG. 11 illustrates the seater module combined with the carriage module in the stroller mode.

Additional Two Modes:

When the seater module is combined with the carriage module as shown in FIG. 11 and the cradle 10 is oriented so as to raise the strapped doll therein to a seated position, then the accessory functions in the stroller mode. But when the cradle is horizontally-oriented, as shown in FIG. 14, then the accessory functions as a baby carriage.

While there has been shown and described a preferred embodiment of MULTI-FUNCTION BABY DOLL ACCESSORY in accordance with the invention, it will be appreciated that many changes and modifications may be made therein without, however, departing from the essential spirit thereof.

I claim:

1. A multi-function accessory for a baby doll, said accessory comprising a seater module and a carriage module combinable therewith, said seater module comprising:
   A. a doll cradle having a bellied-out bottom wall provided with exterior rocker rails, and a pair of parallel side walls from which project threaded studs;
   B. a bail-type handle having a pair of flexible arms which are spaced apart by a distance substantially equal to the width of the cradle, said arms having end bores through which the studs are extendible whereby the handle may be pivoted on the studs and can be made to assume any desired angle relative to said cradle;
   C. hub nuts received on said studs which when tightened act to maintain the desired angular position of the handle relative to the cradle, whereby when said handle is set at an upright position above the cradle, it creates a hand carrier for the doll; when the handle is set at an easel angle behind the cradle, it then creates a car seater; and when the handle is removed from the cradle, it then functions as a rocker for the doll; and said carriage module comprising:
   D. a handleless frame combinable with said seater module to form a stroller or a baby carriage depending on the orientation of the cradle relative to the handle which then functions as the handle for the stroller or the carriage.

2. An accessory as set forth in claim 1 wherein said seater module further includes an L-shaped table clamp, one leg having at its end a latching element which is received in a socket formed at the front end of the cradle, the other leg terminating in a tip which engages the under surface of a table when the handle rests on the upper surface thereof to provide a table seater for the doll.

3. An accessory as set forth in claim 1 wherein said cradle and said handle are molded of synthetic plastic material.

4. An accessory, as set forth in claim 1 wherein each side wall of the cradle is provided with a pair of projecting pins on opposite sides of the stud which are received in pin holes in a circular array of such holes concentric with the bore in the arm of the handle to maintain the position of the arm.

5. An accessory as set forth in claim 1 further including a buckled strap threaded through a slot in the bottom wall of the cradle to hold the baby doll in the cradle.

6. An accessory as set forth in claim 1 wherein said carriage module comprises a pair of parallel arched main frame pieces joined together by crosspieces, said main frame pieces defining front and rear legs, each terminating in a roller.

7. An accessory as set forth in claim 6 further including a removable feeding tray having arms removable in sockets formed in the front legs.

8. An accessory as set forth in claim 6 wherein said main frame pieces have slots formed therein adjacent the peaks of the pieces adapted to receive the ends of the arms of the handle of the seater module.

* * * * *